United States Patent
Rumbaugh et al.

(10) Patent No.: US 7,843,371 B2
(45) Date of Patent: Nov. 30, 2010

(54) ERROR AVOIDANCE IN DATA TRANSMISSION USING DYNAMIC MODIFICATION OF ANALOG SAMPLING RATES

(75) Inventors: Stephen R. Rumbaugh, Martinez, CA (US); Gary M. Kolstoe, Fremont, CA (US)

(73) Assignee: Sofaer Capital, Inc., London (GB)

( * ) Notice: Subject to any disclaimer, the term of this patent is extended or adjusted under 35 U.S.C. 154(b) by 465 days.

(21) Appl. No.: 11/880,466

(22) Filed: Jul. 19, 2007

(65) Prior Publication Data

US 2009/0021410 A1 Jan. 22, 2009

(51) Int. Cl.
*H03M 1/00* (2006.01)
(52) U.S. Cl. ...................................... 341/122; 341/123
(58) Field of Classification Search .................. 341/61, 341/122, 155, 144
See application file for complete search history.

(56) References Cited

U.S. PATENT DOCUMENTS

| | | | | |
|---|---|---|---|---|
| 6,044,089 | A  * | 3/2000 | Ferriere | 370/465 |
| 6,456,651 | B1 * | 9/2002 | Pilozzi et al. | 375/222 |
| 2002/0080932 | A1 * | 6/2002 | Yoshida et al. | 379/93.01 |
| 2002/0191702 | A1 * | 12/2002 | Hoefer | 375/242 |
| 2004/0095257 | A1 * | 5/2004 | Koifman et al. | 340/870.21 |

* cited by examiner

*Primary Examiner*—Brian Young

(57) ABSTRACT

A method and apparatus for error avoidance in data transmission using dynamic modification of sampling rates. An embodiment of a method for transmission of data includes determining the transmission capacity for a transmission channel or channels. A sampling rate is selected based at least in part on the determined transmission capacity for the one or more transmission channels. An instruction, command, or information regarding the sampling rate is inserted in a data packet, and the data packet is transmitted.

24 Claims, 8 Drawing Sheets

ERROR AVOIDANCE IN DATA TRANSMISSION USING DYNAMIC MODIFICATION OF ANALOG SAMPLING RATES

FIELD

Embodiments of the invention relate to data transmission. More particularly, embodiments of the invention relate to error avoidance in data transmission using dynamic modification of analog sampling rates.

BACKGROUND

In transmission of data streams, errors in data often occur as a result of noise, data congestion, or other issues. Data transmission may occur over any medium, including, but not limited to data transmission over a power line, conventional wires or cables, or wireless transmission.

In a conventional system, a receiving unit and a transmitting unit may in some circumstances adjust their operations in response to certain conditions to reduce error occurrence. For example, the receiving unit and transmitting unit may adjust rates regarding transmission if the units agree to a rate modification.

However, conventional systems may not react quickly enough or otherwise operate in a manner that would assist in the avoidance of errors in a time sensitive system. In a time sensitive system, significant data may be lost before the transmission is modified. Because of the time sensitive nature of the data transmission, it may not be possible to retransmit the lost data.

SUMMARY OF THE INVENTION

A method and apparatus are provided for error avoidance in data transmission using dynamic modification of analog sampling rates.

In a first aspect of the invention, a method for transmission of data includes determining the transmission capacity for a one or more transmission channels. A sampling rate is selected based at least in part on the determined transmission capacity. An instruction, command or information regarding the sampling rate is inserted into a data packet, and the data packet is transmitted.

In a second aspect of the invention, an apparatus includes a sampler to sample analog signals, such as an ADC or sensor device, the sampler operating at a particular sampling rate. The apparatus further includes a transmitter to transmit a data stream over one or more communication channels, where the data stream includes data packets, each data packet including one or more samples. The apparatus further includes a control unit to select the sampling rate for the sampler based at least in part on a determined capacity for the communication channel, wherein the apparatus is to insert information regarding the selected sampling rate in one or more of the data packets.

In a third aspect of the invention, an apparatus includes a receiver to receive a data stream from a communication channel, wherein the data stream includes data packets, with a first data packet including a sample rate and data type for data samples in the first data packet. The apparatus also includes a decoder or DAC (Digital to Analog Converter) to decode the plurality of data packets, where the decoder or DAC is to decode the first data packet based at least in part on the sample rate and data type of the data packet.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
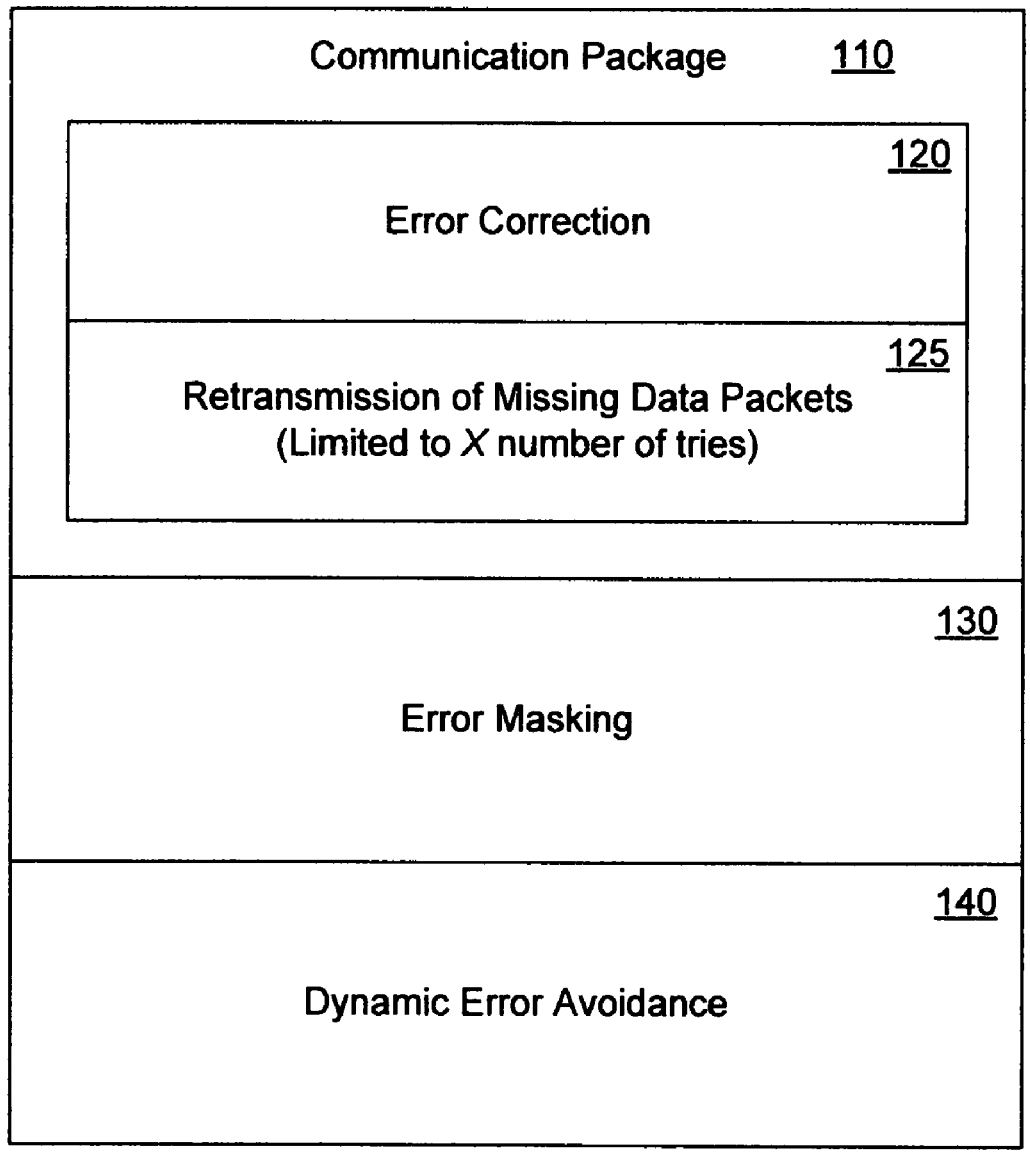
FIG. 1 is an illustration of an embodiment of processes that may be implemented in a system to address data errors.

An embodiment of the invention concerns error avoidance in data transmission using dynamic modification of analog sampling rates.

As used herein:

"Data transmission" means the transmission of data through any transmission medium, including, but not limited to, transmission over a power line, conventional wires or cables, or wireless transmission medium.

"Data packet" means a block or unit of data, including, but not limited to, data referred to as a data packet or frame.

In an embodiment of the invention, a data transmission system provides error avoidance processes. In an embodiment of the invention, a system uses dynamic modification of ADC (Analog to Digital Converter) or sensor sampling rates (referred to herein as "sampling rates"). In an embodiment, a transmitting unit modifies sampling rates in response to current bandwidth conditions. In an embodiment the transmitting unit communicates the modification of sampling rate in the current data being sent, with a receiving unit modifying its sampling rate in conformance with the received changes.

Transmission of time sensitive data has different characteristics and requirements than the transmission of other data that is not subject to such time limitations. Time sensitive data may be, for example, characterized by the existence of a designated time slot, with a beginning and ending time, during which the data transmitted in a specified data packet is scheduled to be present in the receiving device and available for processing or action. Determination of which time slot is designated for a given packet may depend on certain established synchronization requirements. In such circumstances, the processing or other actions of the receiving device are required to occur with a specified time relationship to other events detected or initiated by the transmitting unit. In a simple example, the data of the Nth data packet may be scheduled to be processed or acted upon in the Nth time slot after the initial packet of data is received. Time sensitive data may include, but is not limited to, audio data in which late data cannot be used because the audio time slot has already arrived and has been passed without the needed information to reproduce the original analog signal.

Data that arrives prior to the beginning of the designated time slot, without being excessively early, is considered to be timely, and such data only needs to be queued or otherwise held for processing or action at the designated time. Determination of the maximum allowable time that the data may be early without being too early depends both on the capacity of the receiving device to hold data (such as the size of the available memory buffer) and on maximum allowed lag times between transmission and action by the receiver. However, if the data is received after the end of the designated slot the data is too late, and the receiving device will have already taken action or performed its process without having the valid data to work with. Data arriving between the beginning and ending of the designated time slot may be partially useful, as a portion of the data is too late and the remainder is timely.

In an embodiment, three general strategies may be combined to mitigate problem connected with errors in time sensitive data streams. If errors in data are detected, classic error correction may be utilized at the communication level in both the transmitting and receiving units to provide data without flaws either by correcting the data as the data is received or by retransmitting the data if the data does not arrive as expected. For time sensitive data, the allowed number of transmission retries is limited by the requirement that the data not arrive too late for its designated time slot. In an embodiment of the invention, error masking may be implemented in the receiving unit to generate acceptable (per the requirements of the application) pseudo data to substitute for the data contained in a missing packet. In an embodiment, error avoidance may be implemented in the transmitting unit to substitute a low volume of lower quality but acceptable data (per the requirements of the application) that can be supported by the capacity of the transmission media when the capacity is less than is required for reliable transmission of high quality data.

In an embodiment of the invention, a transmitting unit determines a sampling rate for a transmission, and the transmitting unit provides the sampling rate to a receiving unit in a format containing sampled data. In an embodiment, the transmitting unit selects a combination of a sampling rate and a data format. The choice may, for example be made from a range of sampling rate and data format combinations. The sampling rate may be expressed in terms of a VCO (voltage controlled oscillator), clock, crystal, or other source for timing that determines the rate of sampling.

In an embodiment of the invention, a transmitting unit bases a sampling rate at least in part on current transmission conditions, with such conditions indicating the available bandwidth. In one embodiment, a sampling rate may be modified in response to detectable indicators of transmission channel quality and capacity and of traffic conditions on the transmission channel. Indicators may include, but are not limited to, transmission capacity estimates provided by a communications package, transmission queue availability, retries, collisions, network congestion, time of day, anticipated capacity, historical data and other related indicators. In an embodiment of the invention, capacity measurements or requirements may be modified by detected usages by other devices that share the transmission channel or network.

In an embodiment of the invention, a receiving unit acts as a follower to adjust its sampling rate as indicated in a data packet. In an embodiment, the receiving unit obtains the sampling rate from a transmitting unit as provided in a data packet, and the receiving unit sets its VCO/clock to run at the sample rate indicated in the packet. In an embodiment, the receiving unit also determines data format from the data packet, with the data being unpacked according to the format indicated in the packet.

In an embodiment of the invention, a transmitting unit selects a data format and a VCO/clock (sampling) rate for a next packet based on the bandwidth conditions currently present. In an embodiment, the transmitting unit may have a number of possible combinations of data format and VCO/clock rates may be arranged in a range or sequence, with each shift up in the range resulting in an increase in bandwidth requirements and each shift down in the range resulting in a decrease in bandwidth requirements. In one embodiment, on startup, the transmitting unit may default to a particular combination, such as the lowest (most reliable) combination that is available in the range. However, embodiments are not limited to any particular default condition, and a system may default at any setting, may determine the initial setting based on current conditions, or otherwise determine the starting sample rate and data type. In an embodiment of the invention, subsequent modifications in data format and sampling rate, either upward in the range (faster sampling—more bandwidth needed—less reliable) or down (slower sampling—less bandwidth needed—more reliable), are determined by the transmitting unit based on transmission conditions that are present when a data packet is ready for transmission.

A common characteristic of a conventional underlying communications package is that transmission capacity estimates are reported without consideration of the capacity used by other devices sharing the network. The existence of other devices and the use of network capacity to support their activities will change the capacity level requirement for each data format/sample rate combination. In an embodiment of the invention, a process is provided to detect other traffic and to make adjustments to capacity requirements based upon such traffic. In an embodiment, an adjustment can be made to the reported value for channel capacity (such that increased traffic results in a reduced channel capacity value). In another embodiment, adjustments may be made to capacity requirements assigned to each data format/sample rate combination (such that increased traffic results in increased capacity requirements for each data type/sample rate combination).

FIG. 1 is an illustration of an embodiment of processes that may be implemented in a system to address data errors. A system may include a communications package 110 that provides for error correction 120 by the transmitting or receiving unit. In addition, the system may provide for retransmission of missing data packets 125. However, in a system that is time sensitive, the retransmission of data may be limited, such as limiting to a certain number of attempts to retransmit.

In an embodiment of the invention, a system may also provide for error masking 130 to mask certain errors. In an embodiment of the invention, the system may also include a process for dynamic error avoidance to reduce data errors 140, including the modification of sample rates based at least in part on current channel capacity.

Figure 2:
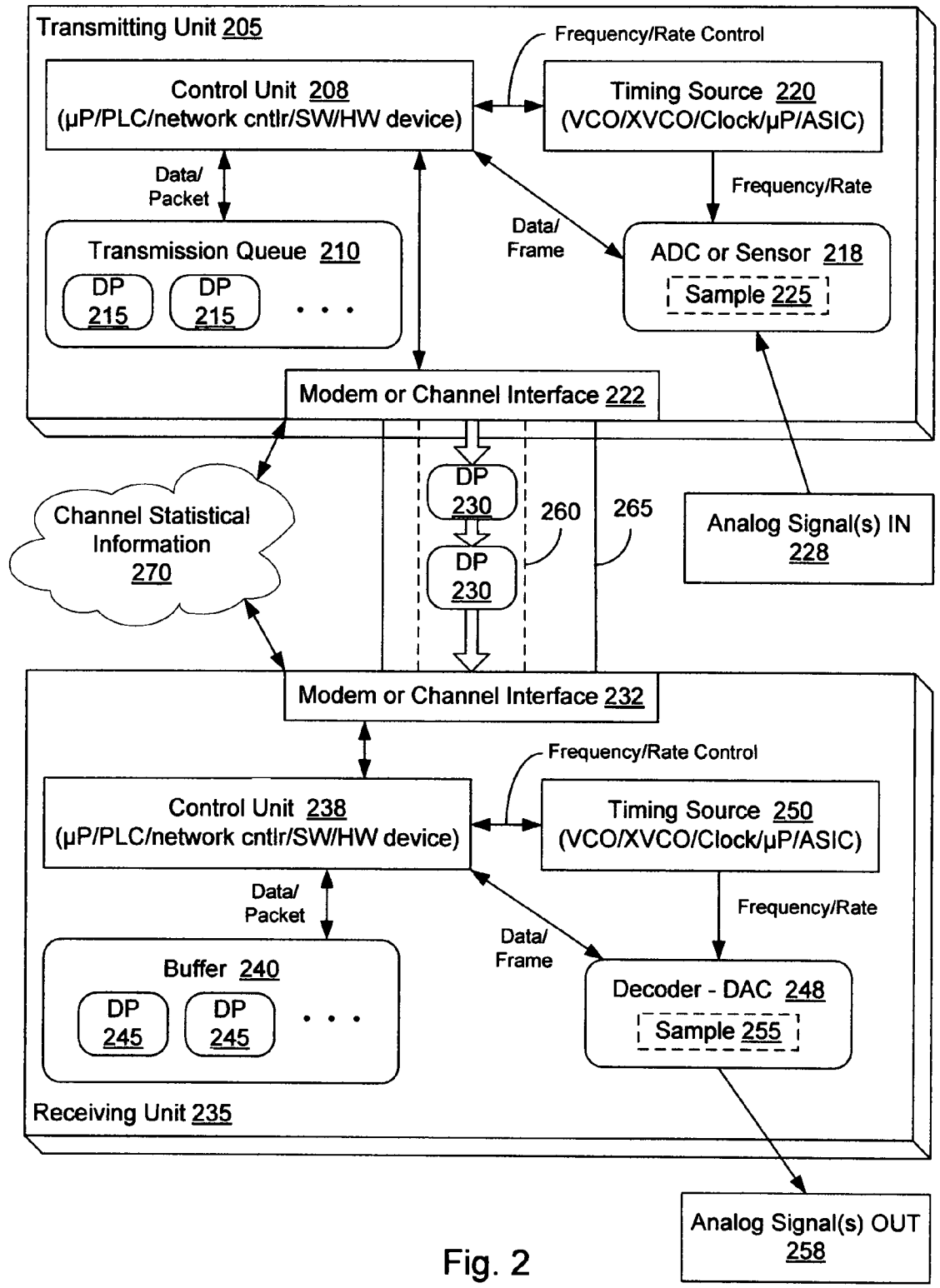
FIG. 2 illustrates an embodiment of a transmitting unit and receiving unit providing for error avoidance based on current transmission channel capacity.

FIG. 2 illustrates an embodiment of a transmitting unit and receiving unit providing for error avoidance based on current transmission channel capacity. In this illustration, a transmitting unit 205 provides a data stream 260 composed of multiple data packets 230, with the data stream 260 being directed to a receiving unit 235. The data packets are transported over a single transmission channel or multiple transmission channels 265. Embodiments of the invention are not limited to any particular type of transmission channel, and may include, for example, a conventional wire or cable, a power line, or a wireless communication connection.

The transmitting unit 205 may include one or more transmission queues 210 containing data packets 215 for transmission. The transmitting unit may further include an analog to digital converter (ADC) or sensor 218 to obtain samples 225 of an analog signal or signals input 228. The ADC or sensor may operate at a sample rate set by a frequency or rate provided by a timing source 220. The timing source 220 may be any timing source, including, but is not limited to, a voltage controlled oscillator (VCO), voltage controlled crystal oscillator (XVCO), clock, microprocessor, or application specific integrated circuit (ASIC).

The receiving unit 235 may be any device or element that may receive data, including, but not limited to, a receiver, controller, router, or other node device. The receiving unit 235 may include a buffer 240 to hold one or more data packets 245 for decoding. The receiving unit may further include a digital to analog converter (DAC) or decoder 248 to convert samples 255 to an analog signal output 258. The DAC or decoder may operate at a sample rate received from a timing source 250. A data decoder may be a part of a data coder/decoder (codec). The transmitting unit 205 includes a control unit 208 to control the unit operations. The transmitting unit further includes a modem or channel interface 232 to send or receive data.

In an embodiment of the invention, the transmitting unit 205 selects the sample rate based at least in part on a current transmission capacity of the transmission channel or channels 265. The transmission capacity may be determined based at least in part on one or more indicators, including channel statistical information 270. The channel statistical information 270 may include, but is not limited to, data events such as data collisions; data retries; or events regarding early, late, missing, out of sequence, or dropped information. In an embodiment, the transmitting unit 205 may select a new sampling rate for the ADC or sensor 218 because of changes in transmission capacity, and the transmitting unit 205 will communicate the new sampling rate in a data packet transmitted to the receiving unit 235. In an embodiment, the receiving unit 235 will modify the sampling rate of the DAC or decoder 248 to match the received sampling rate 225. In an embodiment, the sampling rate 255 may be in a combination with a particular data type, and the sampling rate/data type combination is communicated to the receiving unit 235.

Figure 3:
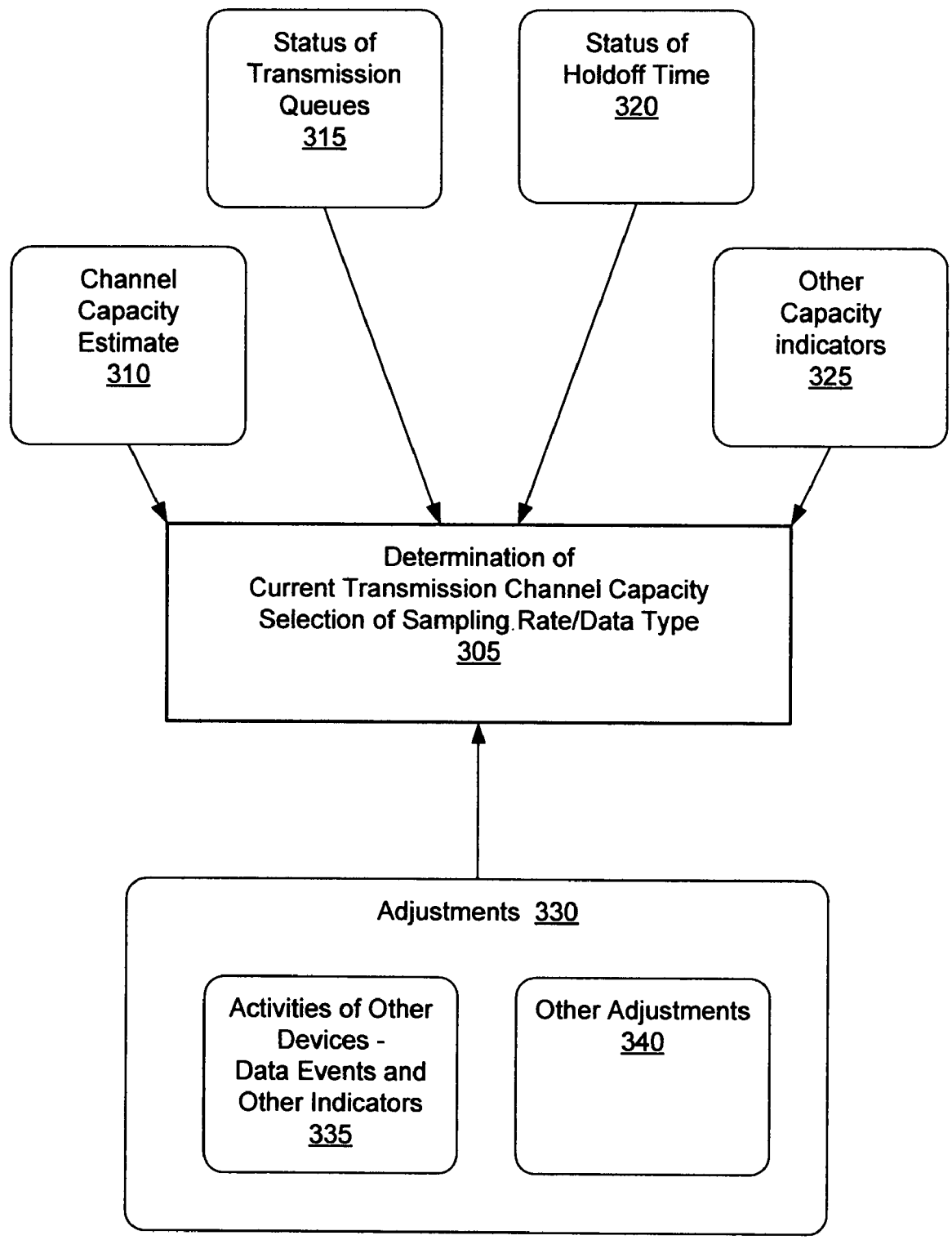
FIG. 3 illustrates an embodiment of elements for determination of a current transmission channel capacity and selection of the sample rate and data type.

FIG. 3 illustrates an embodiment of elements for determination of a current transmission channel capacity and selection of the sample rate and data type. In an embodiment of the invention, a current transmission channel capacity determination 305 may be based on, for example, a channel capacity estimate 310, which may be obtained from an underlying communications package. In addition, the status of transmission queues 315 may also be used in the determination. For example, if transmission queues are full, then the sampling rate may be reduced. A status of a holdoff time 320 may also be relevant, the holdoff time being a delay time before decoding of data is commenced. For example, if the capacity of the transmission channel is sufficient and the holdoff period has expired, a transmitting unit may change or upshift to a higher sample rate and restart the holdoff period. There may also be other capacity indicators 325 that may affect the determination of the transmission capacity.

In addition, there may be adjustments made to the current transmission capacity 330. The adjustments may be made to the value of the transmission capacity, or, conversely, to the values of required capacity for particular sampling rates and data types. For example, activities of other devices, which may be discerned by numbers of data collisions or other similar indicators 335, may be used to reduce the effective transmission capacity of the transmission channel. Further, there may be other adjustments 340 made to the determined transmission capacity.

Figure 4:
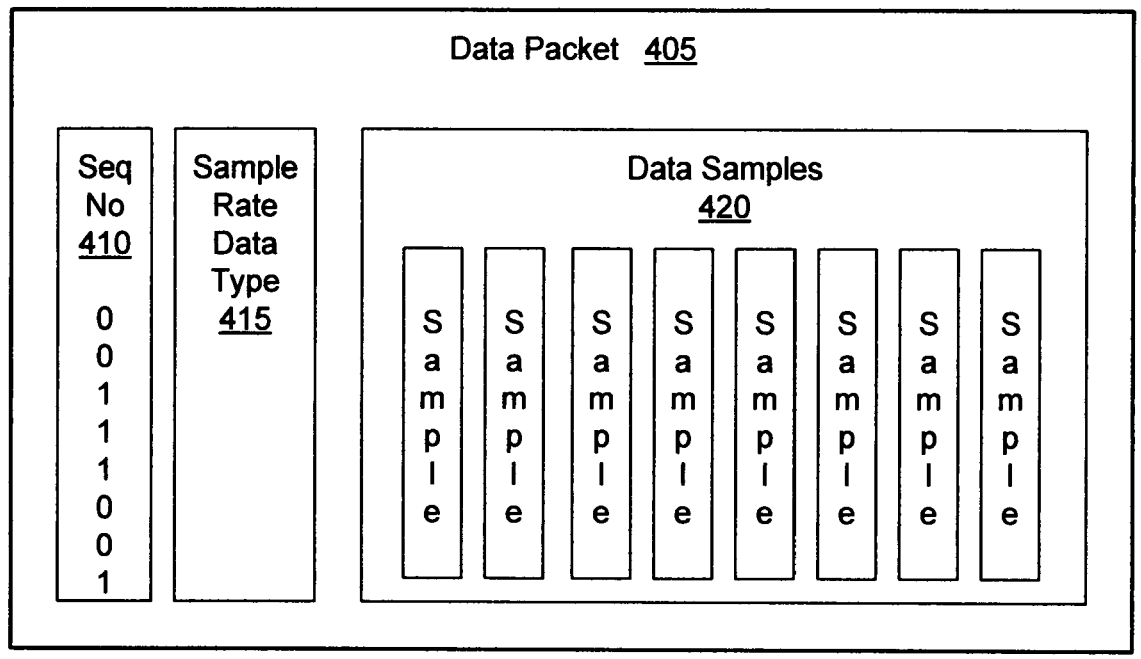
FIG. 4 is an illustration of an embodiment of a data packet.

FIG. 4 is an illustration of an embodiment of a data packet. In an embodiment of the invention, a data packet 405 generated by a transmitting unit, such as transmitting unit 205 illustrated in FIG. 2, may include a sequence number 410 to indicate the position of the data packet in a data sequence, which may thus indicate a time slot for the data packet 405. The data packet 405 may further include a sampling rate and data type 415 for data samples 420 contained in the data sample. In an embodiment, the transmitting unit 205 selects the sampling rate and data type 415 based upon current capacity conditions for a transmission channel. In an embodiment, a receiving unit, such as receiving unit 235 illustrated in FIG. 2, will receive the data packet and decode the data packet based upon the sampling rate and data type 415.

Figure 5:
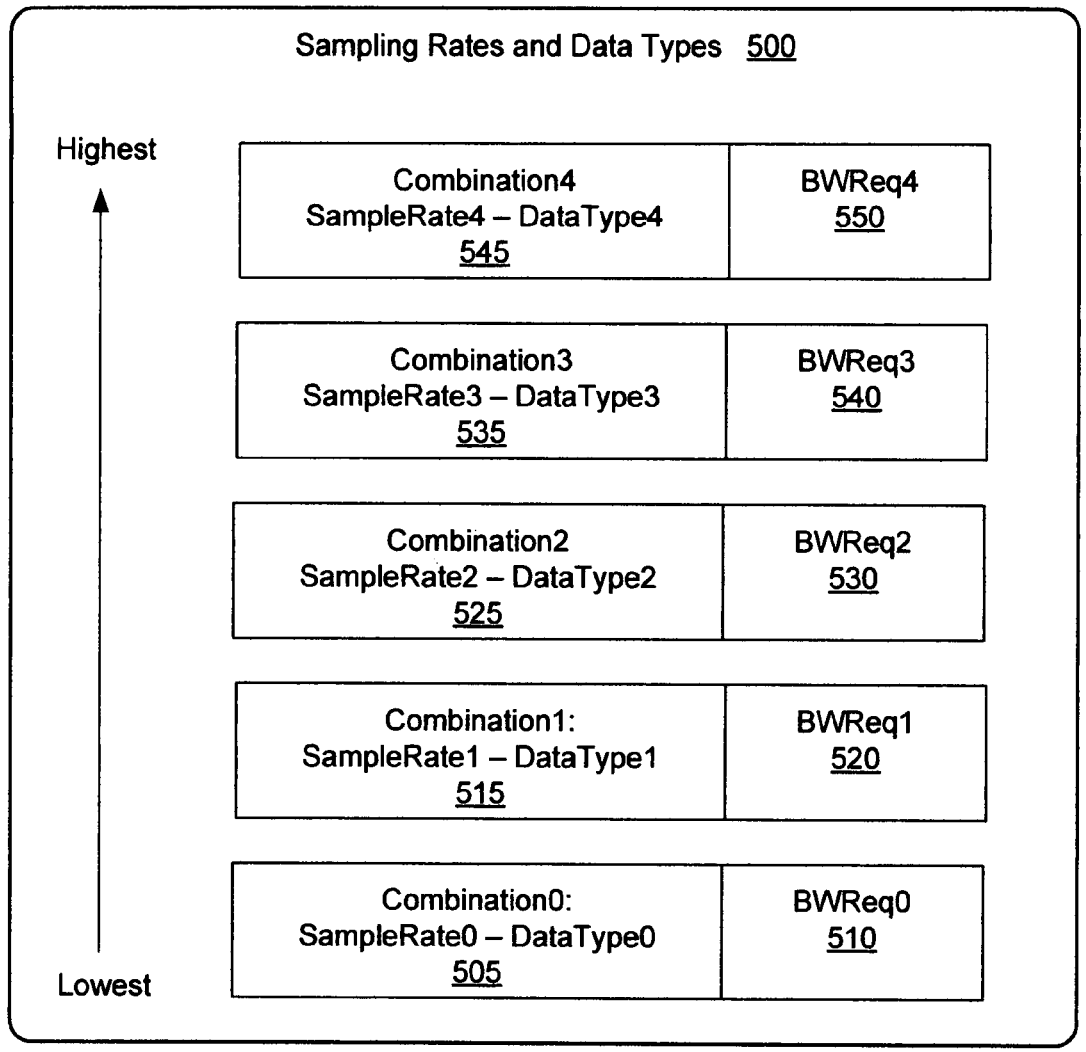
FIG. 5 illustrates an embodiment of a range of combinations of sampling rates and data types.

FIG. 5 illustrates an embodiment of a range of combinations of sampling rates and data types. In an embodiment of the invention, a transmitting unit, such as transmitting unit 205 of FIG. 2, selects a sampling rate and data type combination from a range of combinations. The combinations may run from a lowest level, which includes the slowest sampling rate but provides the highest reliability at the narrowest bandwidth, to a highest level, which includes the fastest sampling rate but provides the lowest reliability and requires the broadest bandwidth. As illustrated, the range runs from a lowest combination, Combination0 505, including SampleRate0 and DataType0 and requiring bandwidth BWReq0 510. The range increases in levels, which are in increasing order Combination1 515 (SampleRate1, DataType1, BWReq1 520), Combination2 525 (SampleRate2, DataType2, BWReq2 530), Combination3 535 (SampleRate3, DataType3, BWReq3 540), and Combination4 545 (SampleRate4, DataType4, BWReq4 550). In an embodiment of the invention, the transmitting unit may shift up or down a level, depending on the current conditions.

Figure 6:
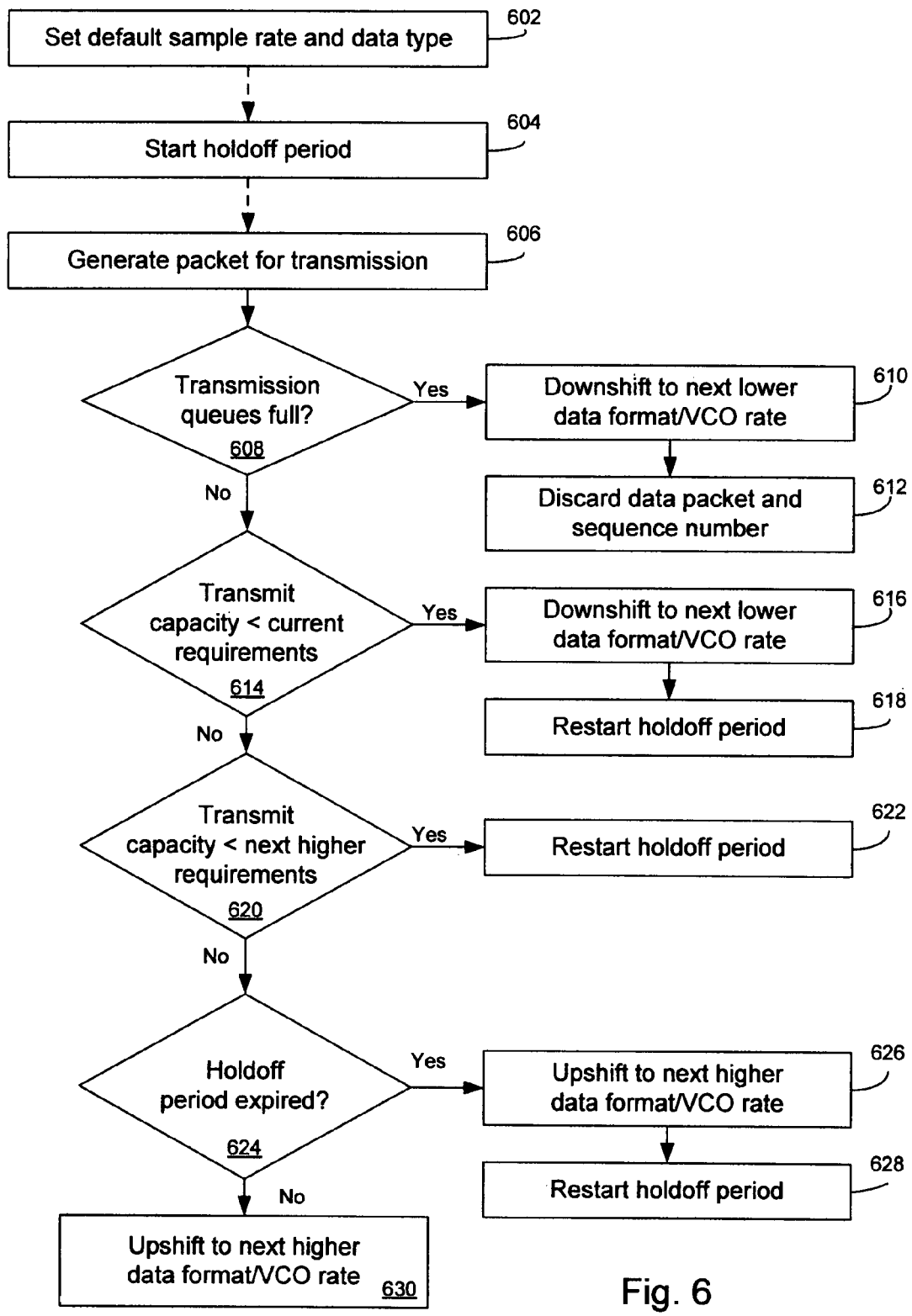
FIG. 6 is a flowchart to illustrate an embodiment of a process for modifying sampling rates and data types.

FIG. 6 is a flowchart to illustrate an embodiment of a process for modifying sampling rates and data types. In this illustration, a system may initially set a default sampling rate and data type 602. The default may be, but is not limited to, a lowest sampling rate/data type combination. In operation, a holdoff period may be commenced 604, with data decoding being delayed until the expiration of the holdoff period. The system may then generate a data packet for transmission 606.

If it is determined that the transmission queues of a transmitting unit are full 608, then the transmitting unit may downshift to the next lower data format, VCO/clock rate (sampling rate) 610. The transmitting unit may further discard the existing data packet and the sequence number for the data packet 612.

If the current transmission capacity is less than the requirements for the current data type, VCO/clock rate 614, then the transmitting unit may downshift to the next lower data format, VCO/clock rate 616 and restart the holdoff period 618. If the current transmission capacity is less than the capacity required for the next higher combination 620, then the holdoff period may be restarted 622. If the current transmission capacity would be sufficient for the next higher combination 620 but the holdoff period has expired 624, then the transmitting unit may upshift to the next higher combination 626 and restart the holdoff period 628. Otherwise, if the holdoff period has not expired, the transmitting unit may simply upshift to the next higher combination.

Figure 7:
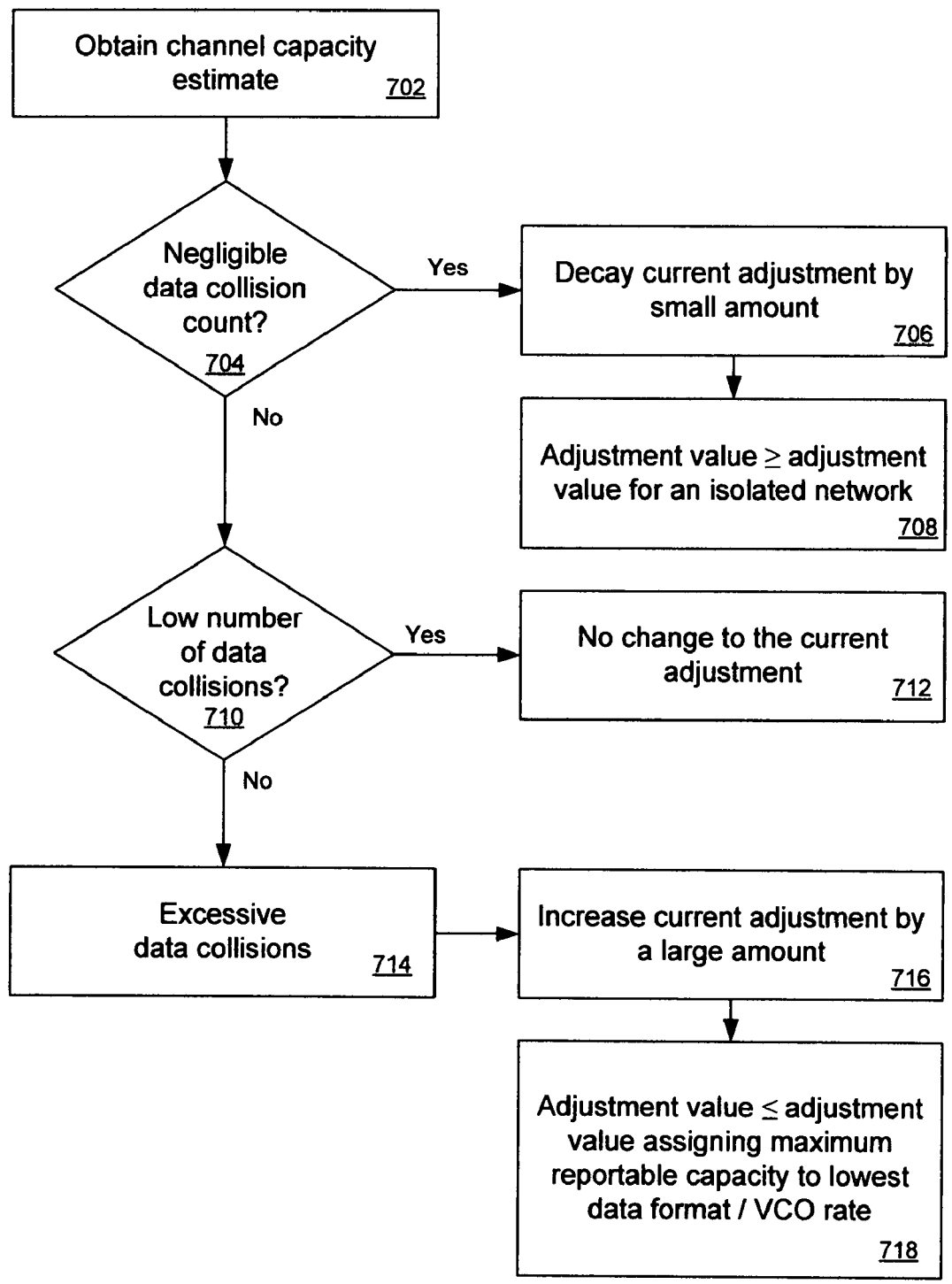
FIG. 7 is a flowchart to illustrate an embodiment of a process for adjusting a determination of transmission capacity.

FIG. 7 is a flowchart to illustrate an embodiment of a process for adjusting a determination of transmission capacity. In this illustration, a channel capacity estimate is obtained from one or more sources 702. If there is a negligible data collision count obtained 704, then a current adjustment to the capacity determination is decayed by some small amount 706, with the restriction that adjustment value remains at least the adjustment level that would apply for an isolated network 708. If there is a low, but not negligible, number of data collisions 710, then there is no change to the current adjustment to the capacity determination 712. Otherwise there are excessive data collisions 714, resulting in a large increase in the adjustment to the capacity determination 716, with the restriction the adjustment level is no more than an adjustment value that would assign the maximum available capacity to the lowest data format, VCO/clock rate combination.

Figure 8:
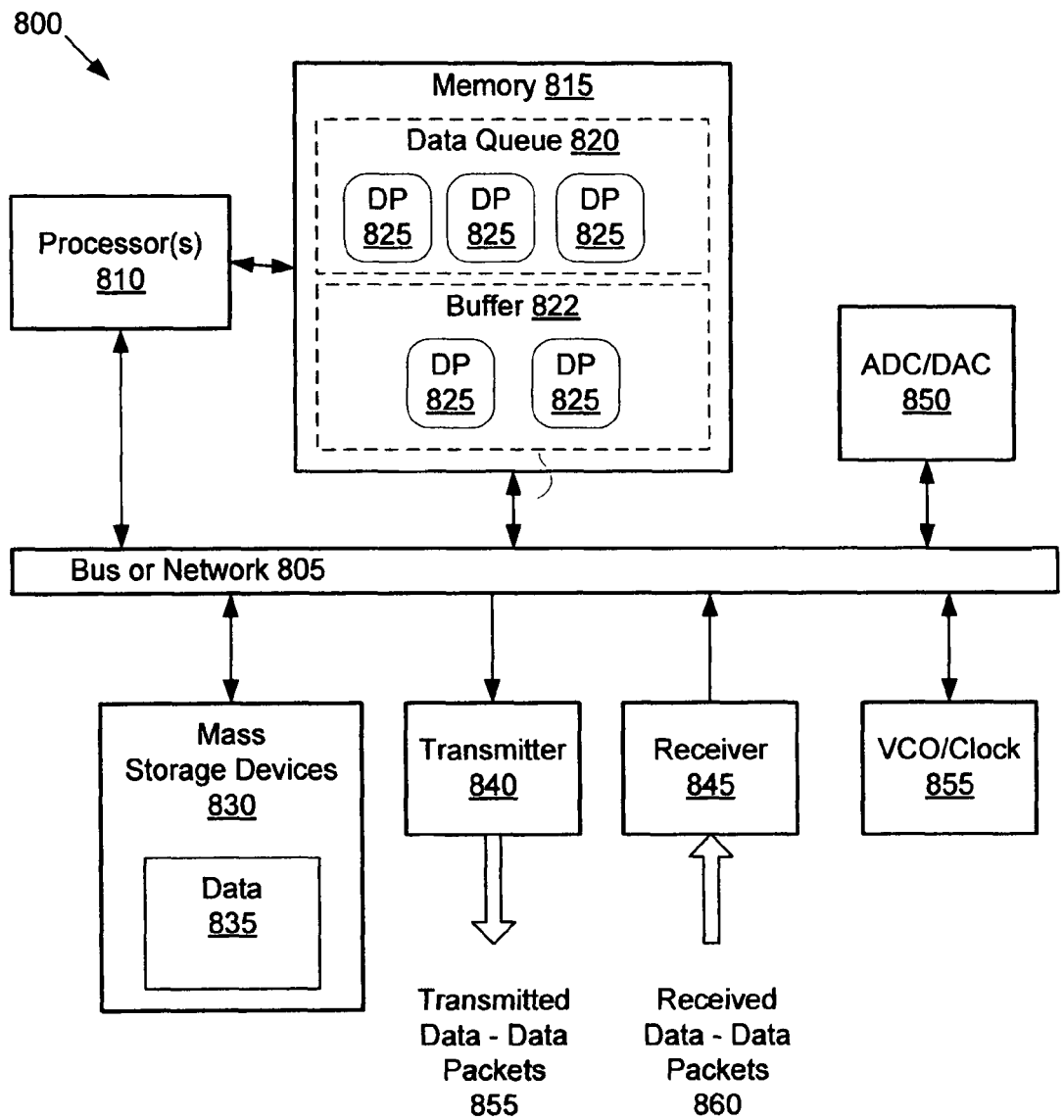
FIG. 8 is an illustration of an embodiment of a transmitting unit or receiving unit.

FIG. 8 is an illustration of an embodiment of a transmitting unit or receiving unit. The unit illustrated in FIG. 8 is one of a variety of different architectures that may be implemented. For ease of illustration, FIG. 8 is a simplified illustration that does no include many well-known elements. As illustrated, the unit 800 may include one or more processors 805 and a memory 810, which are coupled with a communications bus or network 805 (which for simplicity is referred to herein as a "bus"). However, the bus 805 is an abstraction that represents any one or more separate physical buses, network or networks, point-to-point connections, or both connected by appropriate bridges, adapters, or controllers. The bus 805 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 8, the processors 805 may include any control unit that can control the overall operation of the unit 800. A processor 805 may be, or may include, one or more programmable general-purpose or special-purpose microprocessors, network controllers, digital signal processors (DSPs), programmable logic controllers (PLCs), application specific integrated circuits (ASICs), programmable logic devices (PLDs), software, or hardware device, or a combination of such devices.

A memory 815 may be used to store data in operation. Memory 815 represents any form of random access memory (RAM), read-only memory (ROM), flash memory, cached memory, L1 or L2 memory, or the like, or a combination of such devices. In an embodiment, the memory of the unit 800 may include one or more transmission queues 820 for data packets 825 to be transmitted. In an embodiment, the memory 815 may include a data buffer 822 to hold data packets 825 that have been received.

The unit 800 may also include one or more mass storage devices 830 for the storage of data 835. Mass storage devices 830 may be or may include any conventional medium for storing data in a non-volatile manner, such as one or more magnetic or optical based disks.

The unit 800 may include a transmitter 840 for transmission of data including data packets 855 or a receiver 845 for the reception of data including data packets 860, or both a transmitter 840 and a receiver 845. The unit 800 may also include a voltage controlled oscillator (VCO) 850 used for the control of data sampling.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAM's (random access memory), EPROM's (erasable programmable read-only memory), EEPROM's (electrically-erasable programmable read-only memory), magnet or optical cards, flash memory, or other type of media machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method for transmission of data comprising:
   determining a transmission capacity for one or more transmission channels;
   selecting one of a plurality of sampling rates of an analog signal or sensor based at least in part on the determined transmission capacity of the one or more transmission channels, wherein the plurality of sampling rates are a range of sampling rates, and wherein each sampling rate in the range is combined with a particular data type;
   inserting an instruction, command, or information regarding the sampling rate in a data packet; and
   transmitting the data packet.

2. The method of claim 1, wherein transmitting the data packet includes transmitting the data packet to one or more of a receiver, controller, router, or other node device.

3. The method of claim 1, wherein the selection of a sampling rate includes shifting up or down one sampling rate in the range of sampling rates.

4. The method of claim 1, further comprising shifting down to a lower sampling rate if the determined transmission capacity is below a requirement for a current sampling rate.

5. The method of claim 1, further comprising restarting a holdoff period if the determined transmission capacity is below the adjusted requirements of a higher sampling rate.

6. The method of claim 1, wherein selecting a sampling rate includes shifting up to a next higher sampling rate if a holdoff period has expired.

7. The method of claim 1, wherein determining the transmission capacity includes adjusting the determined capacity based at least in part on activities of other units on the transmission channel or channels.

8. The method of claim 7, wherein adjusting the determined capacity includes adjusting the determination based at least in part on a number of detected data events on the one or more communication channels.

9. The method of claim 8, wherein the data events include one or more of data collisions; data retries; or events regarding early, late, missing, out of sequence, or dropped information.

10. The method of claim 1, wherein the data packet includes audio sample data.

11. An apparatus comprising:
    a sampler to sample analog signals or sensors, the sampler operating at a sampling rate wherein the sampler is an analog to digital converter (ADC) or sensor;
    a transmitter to transmit a data stream over one or more communication channels, the data stream including a plurality of data packets, each data packet including one or more data samples; and
    a control unit to select the sampling rate for the sampler based at least in part on a determined capacity for the one or more communication channels, the apparatus to insert information regarding the selected sampling rate in one or more of the plurality of data packets.

12. The apparatus of claim 11, wherein the determined capacity of the communication channel is based at least in part on an estimate of the channel capacity provided by a communications package.

13. The apparatus of claim 11, further comprising one or more data transmission queues, wherein the control unit is to shift the sample rate to a lower sample rate if the one or more data transmission queues are full.

14. The apparatus of claim 11, wherein the control unit is to adjust the determined capacity of the transmission channel based at least in part on activities of other apparatuses on the communication channel.

15. The apparatus of claim 11, wherein the selection of the sampling rate includes selecting one of a plurality of combinations, each combination having a sampling rate and a data type.

16. The apparatus of claim 11, wherein the control unit includes one or more of a microprocessor, network controller, digital signal processor (DSP), programmable logic controller (PLC), application specific integrated circuit (ASIC), or programmable logic device (PLD).

17. An apparatus comprising:
    a receiver to receive a data stream from one or more communication channel, the data stream including a plurality of data packets, a first data packet including a sample rate and data type for data samples in the first data packet; and
    a decoder or DAC (Digital to Analog Converter) to decode the plurality of data packets, the decoder or DAC to decode the first data packet based at least in part on the sample rate and data type of the data packet.

18. The apparatus of claim 17, wherein the sample rate is based on a current capacity of the communication channel or channels.

19. The apparatus of claim 17, wherein the sample rate and data type are one of a plurality of combinations of sample rates and data types.

20. The apparatus of claim 17, further comprising a VCO (voltage controlled oscillator), clock, crystal, or other timing source and wherein a rate of the timing source is set based on the sample rate.

21. A communication system comprising:
    a transmission channel;
    a transmitting unit, the transmitting unit to transmit a data packet on the transmission channel, the transmitting unit to include a sampling rate for data in the data packet, the transmitting unit to select the sampling rate based on a current transmission capacity of the transmission channel; and
    a receiver to receive the data packet, the receiving to decode the data packet based at least in part on the sampling rate in the data packet.

22. The communication system of claim 21, where the sampling rate is part of a combination, the combination also including an associated data type.

23. The communication system of claim 21, wherein the transmitting unit is to select the combination from a range of combinations of sampling rates and data types.

24. The communication system of claim 21, wherein the transmission channel is one of the group comprising a cable, a power line, or a wireless connection.

* * * * *